Nov. 3, 1931.   R. DEVILLERS   1,830,427
PLANT FOR THE MANUFACTURE BY CENTRIFUGATION OF PIPES
OF ANY NATURE, AND PARTICULARLY OF METAL PIPES
Filed May 3, 1928   3 Sheets-Sheet 1
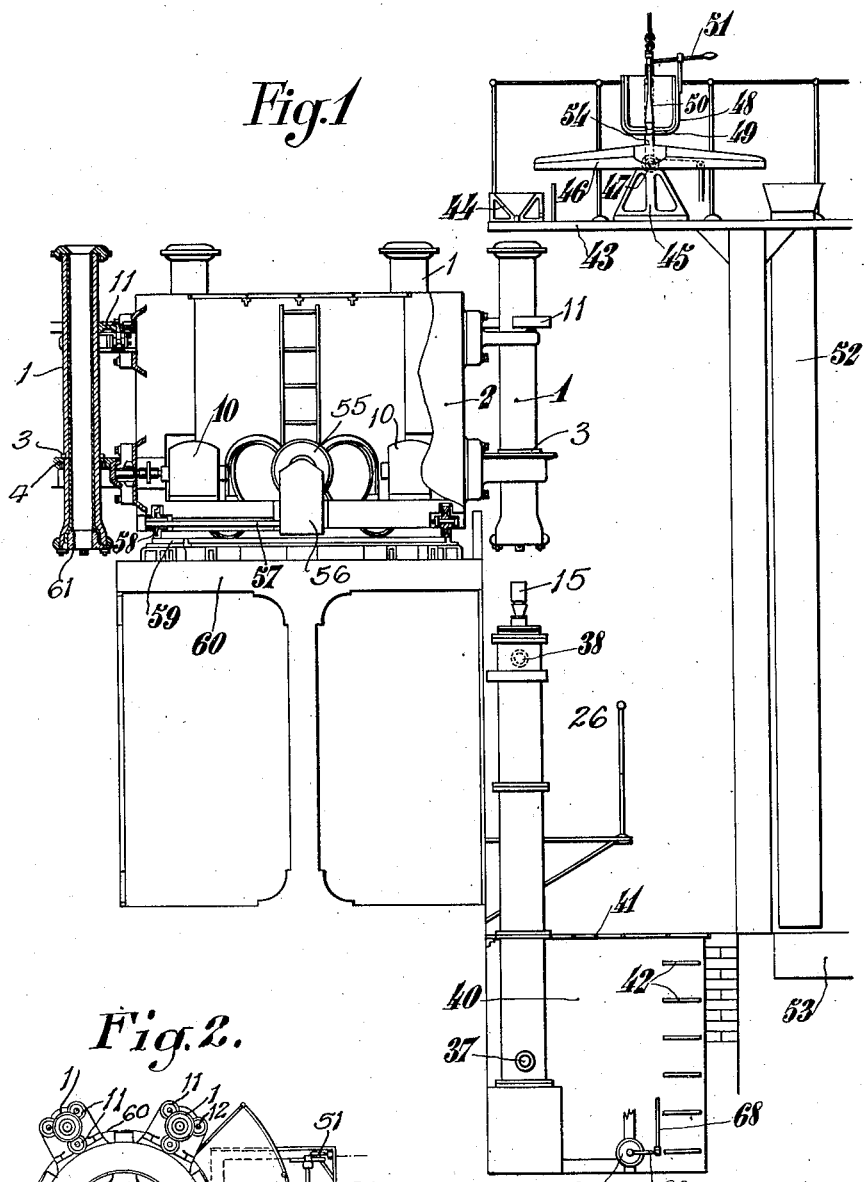
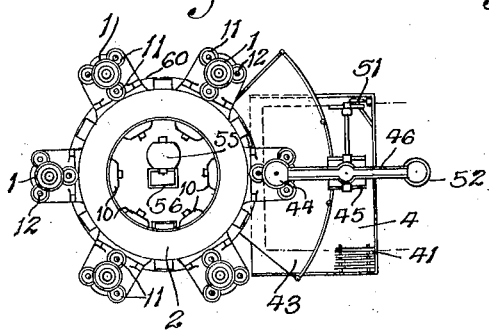
R. Devillers INVENTOR

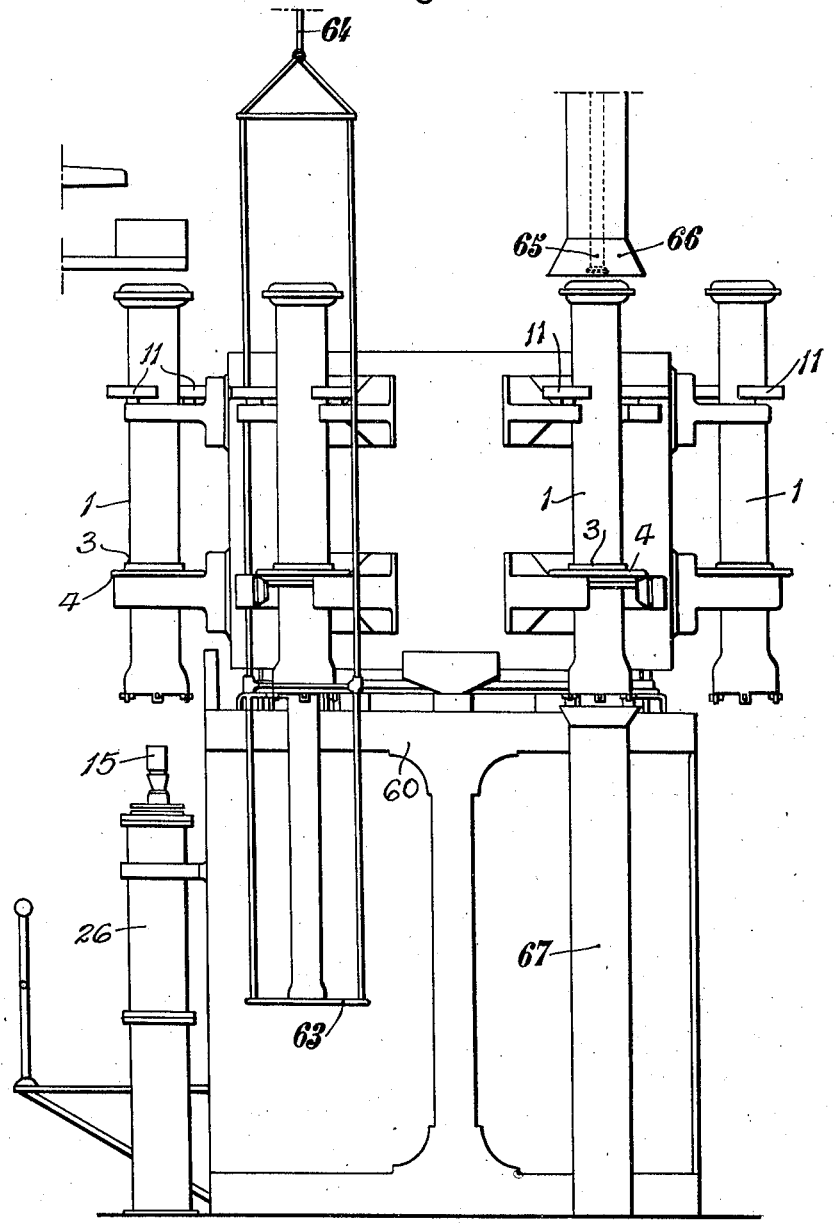

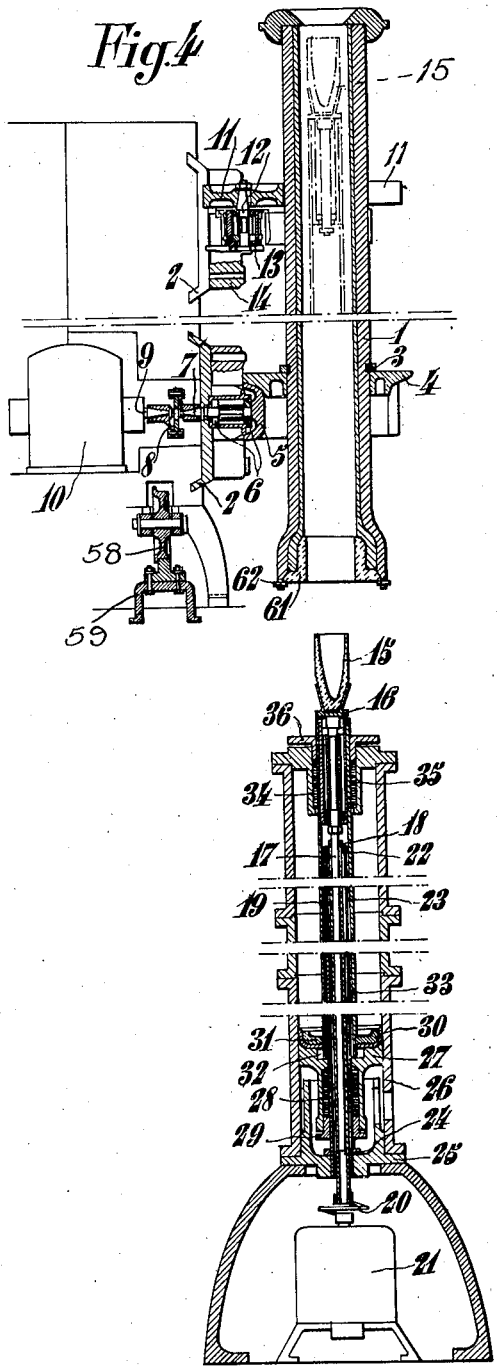

Patented Nov. 3, 1931

1,830,427

UNITED STATES PATENT OFFICE

RENÉ DEVILLERS, OF PARIS, FRANCE, ASSIGNOR TO SOCIETÉ D'EXPANSION TECHNIQUE, OF PARIS, FRANCE, A JOINT-STOCK COMPANY

PLANT FOR THE MANUFACTURE BY CENTRIFUGATION OF PIPES OF ANY NATURE, AND PARTICULARLY OF METAL PIPES

Application filed May 3, 1928, Serial No. 274,931, and in France May 19, 1927.

The present invention has for its object a plant for the manufacture by centrifugation of pipes of any nature, and particularly of metal pipes.

The main object of this invention is to considerably modify such a plant to render its operation more certain, to diminish the time required for manufacturing a pipe, to reduce labour and the space occupied by such a plant, and consequently to diminish the cost price both of the plant itself and of the manufactured products.

The accompanying drawings illustrate, by way of example only, a form of construction of this plant.

Fig. 1 is an elevation, partly in section.

Fig. 2 is a plan view relating to Fig. 1.

Fig. 3 is an elevation similar to Fig. 1 but seen on the rear face.

Fig. 4 is an elevation and section through the axis of a mould and of the jack for lifting the crucible.

In the example illustrated, the plant comprises six moulds 1 arranged on a revolving frame 2. It is obvious that the number of the moulds 1 might be different according to circumstances.

In this example, the six cylindrical moulds vertically arranged, are located at the apex of a regular hexagon.

Each mould is mounted on the frame as indicated hereinafter.

At the lower part, each mould 1 is secured to a flange 3, said flange bearing against a friction or toothed wheel 4, said wheel being in engagement with another wheel 5, suitably supported by bearings 6 integral with the revolving frame 2. The wheel 5 is mounted on an axis 7, which is connected by a distortable joint 8 to the shaft 9 of a motor 10. The motors 10 are supported by the frame 2; a motor is provided for each tube. At the upper part, each mould is guided between three rollers 11 regularly distributed; each of these rollers is mounted on a spindle 12 rotating in a bearing 13, carried by a frame 14, which is secured on the revolving frame 2. According to the diameter of the mould, use is made of different rollers 11 for giving passage to moulds of greater or less diameters.

Within a mould such as 1, when it is in its working position, as indicated hereinafter, can be axially displaced a crucible 15 forming at the same time a deflector, as will be explained later on. This crucible 15 is mounted in a support 16 rigid with a rod 17 having a prismatic cross section. This rod of prismatic cross section can slide within a socket 18, of similar shape, provided at the end of a tube 19 receiving a rotary movement, through the medium, preferably, of a distortable joint 20, by means of a motor 21. The tube 19 is supported, at its end, by a bearing 22 separating it from another tube 23 secured, by its lower part, at 24, on a support 25 for the pump barrel 26.

On the tube 23, which is externally machined, slides the piston 27. This piston is provided at 28 with a fluid-tight packing which is held by the stuffing-box gland 29; moreover, it is provided, on its upper face, with a cup leather 30 which is held by the ring 31 and the nut 32. The whole of the piston is rigid with a tube 33, which slides within the stuffing-box 34, terminating the pump barrel 26; the fluid-tight packing of this stuffing box is shown at 35 and the gland at 36. This arrangement of the two tubes 23 and 33 allows to machine only tubes on the external part. It is to be noted that the pump barrel 26 can be made in one or more juxtaposed parts.

Water or other fluid under pressure is introduced below the piston, that is to say at 37, or above the said piston, that is to say at 38, for the reasons which will be explained later on. The motor 21 and the cock 39 which allows the introduction of the water under pressure at 37 are arranged within a pit 40, which pit is closed at its upper part by a grate 41 allowing the aeration of the motor 21. Bars or rungs, such as 42, constitute means to permit ready access to the pit 40.

Above the upper ends of the tubes 1 is a platform 43. On this platform 43 is arranged, at 44, a casting funnel or jet below which is placed the mould 1 in casting position. The platform 43 supports, on the other hand, through the medium of the bracket 45, a throat 46 rocking about the axis 47. This rocking throat is arranged below a ladle 48, which is brought to this place, full of molten metal, by any suitable conveying means. The said ladle forming, at 49, a casting hole which can be closed by a plug 50 which can be actuated by the lever 51.

The rocking throat 46 is thus provided with two casting noses, one of which can bring the metal in the funnel 44, and the other in a conduit 52 leading, at its lower part in a gutter 53. When the molten metal of the ladle 48 is cold or soiled, the throat is inclined by means of the lever 51, for causing this soiled cast-iron to flow in the conduit 52; when, on the contrary, the cast-iron is hot and clean, the throat is inclined for causing the molten metal to flow in the funnel 44.

The molten metal falls in the crucible 15 which, at this moment, receives a rotary movement from the motor 21. Moreover, the crucible 15 is in its upper position, as illustrated in dot and dash lines in Fig. 4, and it begins at this moment its downward movement. The motor 10 rotates and causes the mould 1 to rotate. The rotation of the mould 1 and that of the crucible 15 are chosen in order that the metal, projected by centrifugal force outside the crucible 15 in the form of a conical sheet, having a parabolic generatrix, reaches the inner wall of the mould 1 at a tangential speed equal to the speed of this mould that is to say the speed of rotation of the crucible 15 must be modified according to the variable diameter of the mould 1.

The metal, thus projected in the form of a sheet by the rotation of the crucible against the walls of the mould, and held against the walls by centrifugal force, solidifies against the walls of the said mould in proportion as the crucible 15 continues its downward movement. When this crucible is at the end of its downward stroke the feeding with molten metal is stopped. The pipe is finished. At this moment, the motor 55, which is placed within the revolving frame 2, is started. This motor 55, through the medium of a speed reducing mechanism 56, actuates a shaft 57 on which is rigidly secured one of the wheels 48 supporting the frame 2.

These wheels 58 run on circular rails 59, arranged on a platform 60. Owing to the movement of the motor 55, the frame 2 rotates until another mould comes in working position. At this moment, the stoppage automatically takes place by the opening of a contact in series on the supply circuit of the engine 55. A new mould being thus placed in working position, a new casting will be effected in the same conditions as the preceding one.

The mould containing a tube already moulded, has come, in the course of the rotation of the frame 2, to the adjacent position, which constitutes the unmoulding position. In this position, it is possible to extract the refractory socket 61 partially obturating the mould at its lower part, at least in the case of tubes having a flared end, such as those illustrated. When this refractory socket is removed, which is very easily effected by removal of the keys 62, the tube is easily withdrawn from the mould; for that purpose, it rests on a platform 63 which is actuated by any suitable lifting means, such as 64. When the tube is suitably extracted, it is rocked by any suitable means for transport.

When the moulded tube is thus extracted, another tube has been cast, and the frame 2 is subjected to a new rotation. The mould from which the tube has been extracted, then comes to the cooling position. In this position, it is placed below a water inlet 65 surrounded by a casing 66 serving to evacuate the steam evolved. The water entering the pipe line 65 passes through the mould on the inner walls of which this water is projected. The mould transmits its calories to the water, this ensuring the cooling of the mould and produces a certain quantity of steam which is collected by the casing 66. The water reaching the lower part of the mould is collected by the pipe line 67.

In the other subsequent positions, operators ensure the replacing of the refractory sockets 61 in position, in such a manner that the moulds are again prepared for a new casting operation.

As previously indicated, the cooling of the moulds might also be effected by circulation of air, but, in this case, instead of injecting water in the mould as is effected for water it would usually be advantageous to suck air through the mould.

In the practical realization of the plant, a kinematic connection 68 is provided between the lever 54 actuating the throat, and the lever 69 actuating the cock 39; in this way as soon as the casting begins, by inclination of the throat towards the funnel 44, the cock 39 opens, and allows the evacuation of the water contained in the pump barrel, this ensuring the descent of the crucible. At the same time, the electric motor 21 ensuring the rotation of the crucible is started. Moreover as soon as the descent of the crucible is completely terminated the circuit of the motor 21 is automatically broken and is closed again only when the following casting operation is effected. When the crucible has thus completely moved down, the circuit of the motor 55 is automatically closed; it will automatically open when a fresh mould will come to working position. The closing and opening of the circuit of the electric motor 21 ensuring the rotation of the crucible produce at the same time the closing and opening of the circuit of the motor 10 associated with the mould actually in working position. For effecting these various switchings, numerous means may be used which are in the domain of the technics, and need not be more completely described.

What I claim as my invention and desire to secure by Letters Patent is:—

1. In an installation for casting pipes by centrifugalization, molds arranged vertically on a revolving frame for rotary movement only, a crucible adapted to be displaced vertically in the interior of a mold when the latter is led above same, means for rotating the mold on itself and fluid controlled means for displacing the said crucible axially in the said mold for distributing the molten metal against the internal wall of the mold during simultaneous rotation of the crucible and mold.

2. In an installation for casting pipes by centrifugalization, rotating molds arranged vertically on a revolving frame and distributed on the vertices of a regular polygon centered on the axis of rotation of the frame, a platform for supporting the said frame and means for carrying along the latter in rotation, a vertical pump body below the frame, a piston in the said pump body, means for controlling the admission and evacuation of a driving fluid in the said pump body and imparting vertical displacements in the two directions to the said piston, a tubular rod connected to the piston, a support bearing at the end of the said rod and adapted to receive a crucible, a vertical rod integral with the said support and movable axially in a tube, means for angularly connecting the said rod and the said tube and for carrying along the latter in rotation, and means for distributing a jet of molten metal at the bottom of the crucible.

3. A device of the class described comprising a frame, means for rotating the frame, a plurality of vertically disposed molds carried by the frame, means for rotating the molds, a pump body below the frame, a piston movable in the body, a tube extending axially through the piston, a rod in the tube and rotatable therewith, a crucible connected with the upper end of the rod, fluid means for actuating the piston for moving the crucible vertically in a mold, and means for rotating the tube and rod, and thus the crucible during movement in the mold.

In testimony whereof I have signed my name to this specification.

RENÉ DEVILLERS.